Jan. 3, 1961  P. A. DODGE  2,967,251
ELECTRONIC POWER SUPPLY REGULATOR
Filed June 5, 1957  3 Sheets-Sheet 1
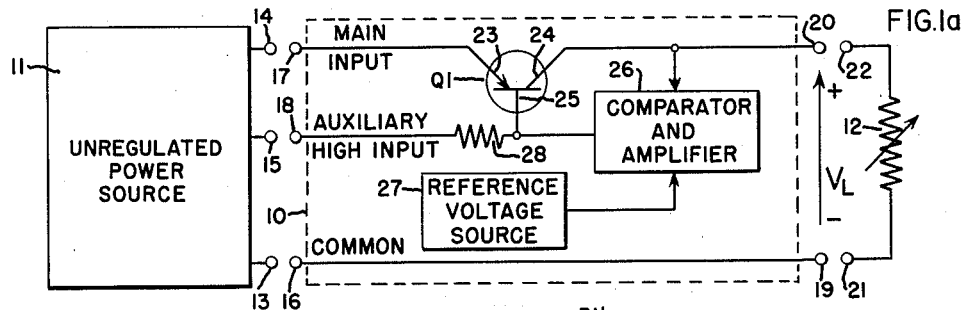
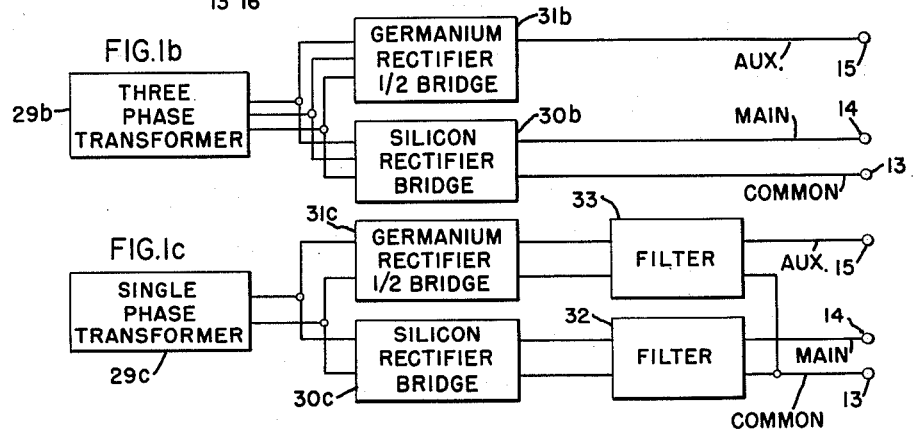
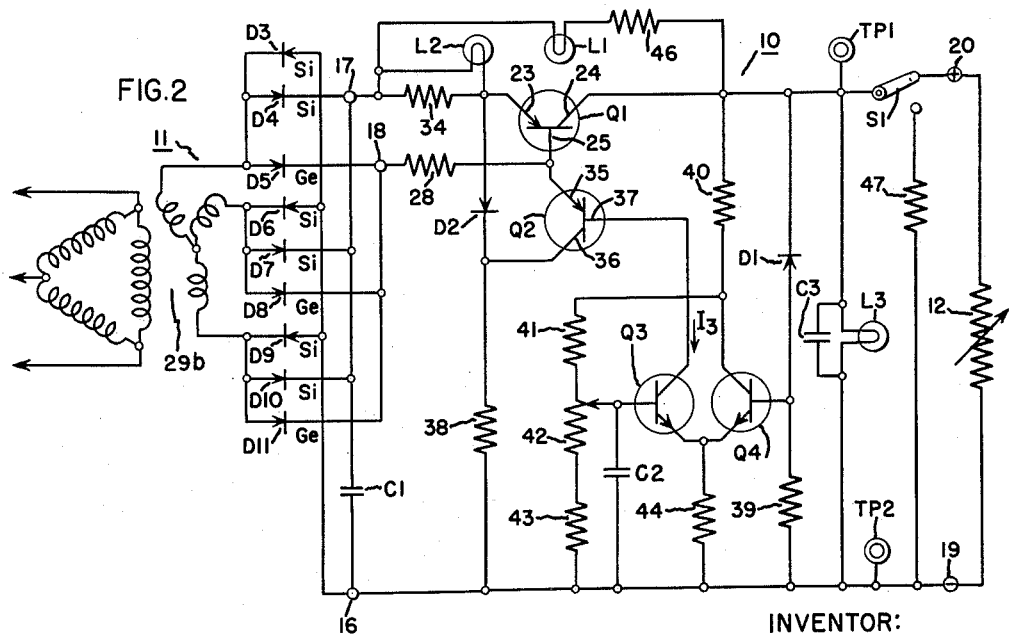
INVENTOR:
PAUL A. DODGE,
BY Donald C. Keaveney
HIS ATTORNEY.

Jan. 3, 1961 P. A. DODGE 2,967,251
ELECTRONIC POWER SUPPLY REGULATOR
Filed June 5, 1957 3 Sheets-Sheet 2
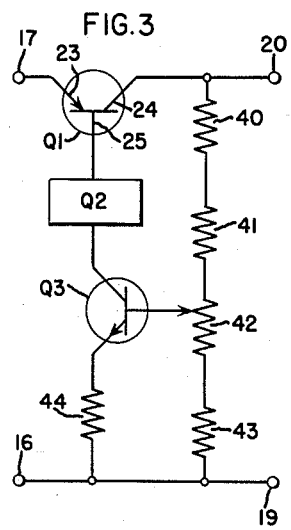
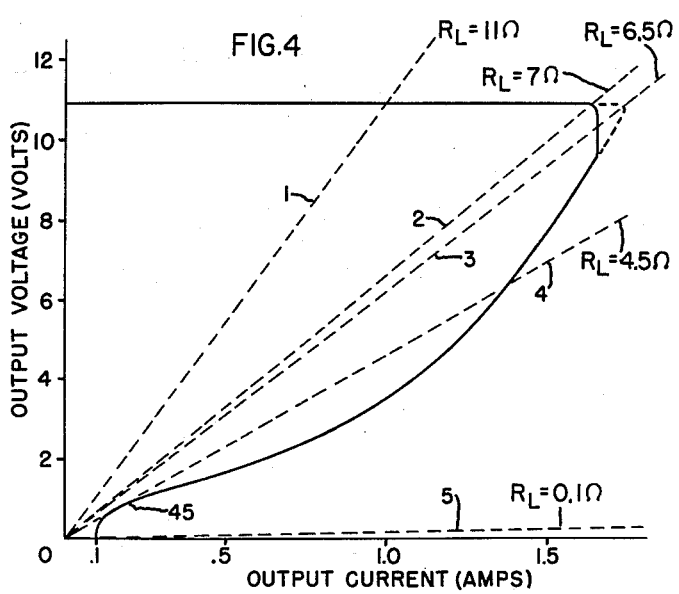
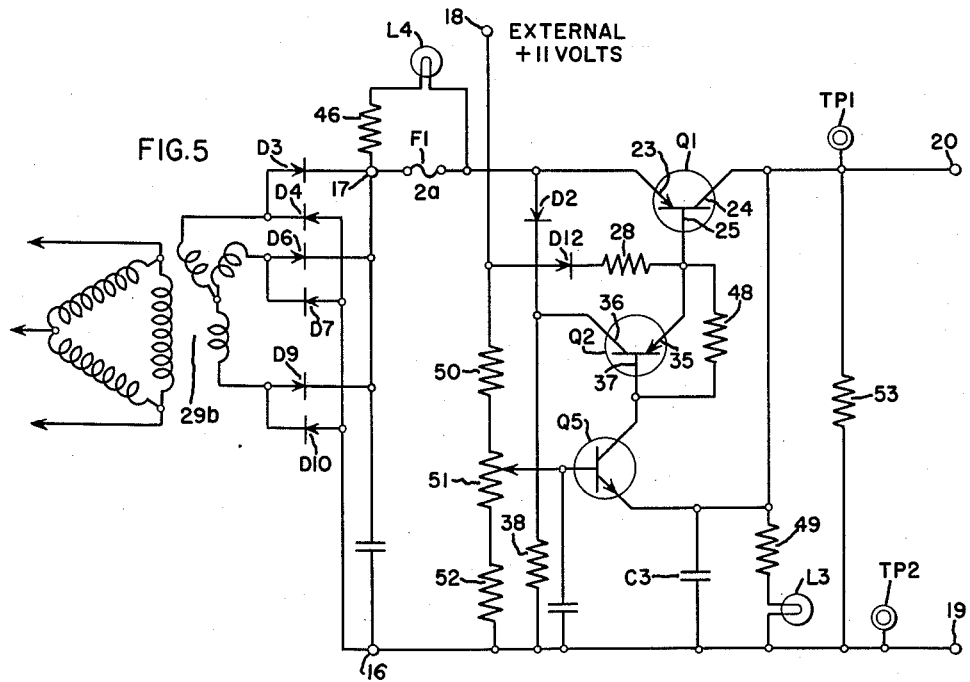
INVENTOR:
PAUL A. DODGE,
BY Donald C. Keaveney
HIS ATTORNEY.

Jan. 3, 1961 P. A. DODGE 2,967,251
ELECTRONIC POWER SUPPLY REGULATOR
Filed June 5, 1957 3 Sheets-Sheet 3
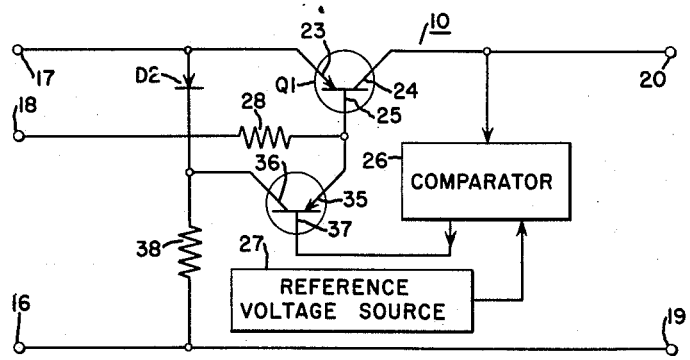
FIG.6
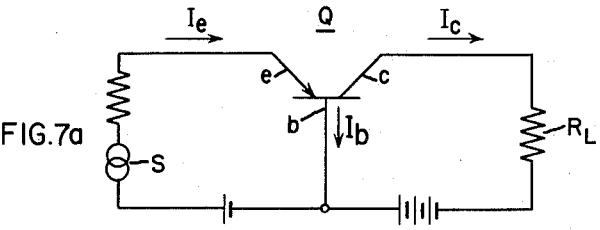
FIG.7a
FIG.7b
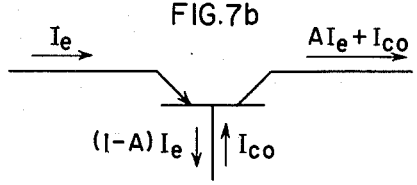
FIG.7c
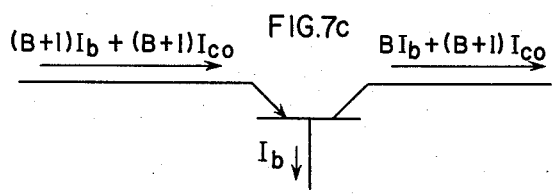
FIG.7d
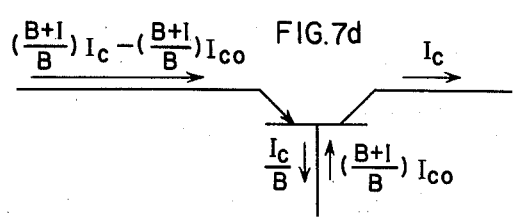
INVENTOR:
PAUL A. DODGE
BY Donald C. Keaveney
HIS ATTORNEY.

United States Patent Office 2,967,251
Patented Jan. 3, 1961

---

2,967,251

ELECTRONIC POWER SUPPLY REGULATOR

Paul A. Dodge, Baldwinsville, N.Y., assignor to General Electric Company, a corporation of New York Filed June 5, 1957, Ser. No. 663,707

5 Claims. (Cl. 307—151)

This invention relates to improved semiconductor circuitry for electronic regulation of voltage and current. More particularly, this invention relates to a power supply regulator adapted for use in such equipment as transistorized digital circuitry and apparatus or the like.

It is often desirable to control the voltage supplied to a load circuit from a power source to within predetermined levels irrespective of variations in the power source or the load circuit. Where the power to be applied to a load circuit is obtained from a source of poor regulation, it is common to employ a voltage regulator between the source and load circuit to maintain the voltage applied to the load circuit substantially constant. Many regulator circuits have in the past been developed for this purpose.

Known voltage regulator circuits, however, are not fully satisfactory at the relatively small values of load current and the relatively low output voltages which are frequently required when the load includes such semiconductor devices as transistors. In the co-pending application of Paul A. Dodge, S.N. 651,519, filed April 8, 1957, entitled "Electrical Signal Regulator" and assigned to the same assignee as the present invention, a transistorized voltage and current regulating arrangement is disclosed which overcomes many of the undesirable features of prior regulating arrangements and which also provides an improved transition from a normal regulation state to an overload protection state as well as a means for adjusting the output impedance of the regulator to a positive or negative value in the normal regulation region.

The voltage and current regulator of the aforesaid application includes a junction type power transistor connected in series between an unregulated power source and a load circuit. A control signal derived from the output voltage of the regulator is used to control the base current of the power transistor in such a fashion that the power transistor acts as a variable impedance tending to maintain the output voltage of the regulator at a constant value. In any such series regulator difficulty is generally experienced in maintaining regulation at small load currents where the regulating transistor attempts to become a high impedance since the driving or control circuitry can at best reduce the base current of the power transistor to essentially zero which still permits a substantial flow of collector current.

The present invention is an improvement over the above noted application and over prior regulating arrangements in that means are provided for actually reversing the base current so that the impedance of the power transistor can be made much higher than has heretofore been possible. The possibility of controlling the conductive state or impedance of the transistor by drawing negative or reversed base current permits accurate regulation under extreme operating requirements, that is, at smaller load currents in a series type regulator and at larger load currents in a shunt type regulator. The reversal of the base current may, for example, be accomplished by returning the base of a junction type p-n-p power transistor to a voltage greater than that of the main power input to the regulator.

The present invention also relates to other improvements such as improved means for controlling or shaping the output characteristics of the regulator and improved means for insuring maximum reliability and maintainability of the regulator circuit.

It is therefore an object of my invention to provide a new and improved transistorized voltage and current regulator capable of satisfactory performance at smaller and larger load currents or over wider operating conditions than has heretofore been possible.

It is a further object of my invention to provide an improved signal processing arrangement.

It is a further object of my invention to provide a voltage and current regulating arrangement having means for improving the transition from its normal regulating state to its overload protective state and having improved means for controlling the voltage vs. current output characteristics of the regulator.

It is a further object of my invention to provide an improved arrangement for analyzing any failures of the regulating circuit and for indicating the operating conditions of the regulating circuit in order to insure maximum reliability and maintainability.

While the novel and distinctive features of the invention are particularly pointed out in the appended claims, a more expository treatment of the invention, in principle and in detail, together with additional objects and advantages thereof, is afforded by the following description and accompanying drawings in which:

Fig. 1a is a block and partially schematic diagram of an electronic voltage and current regulator.

Figs. 1b and 1c are more detailed block diagrams of two different circuits which may be used as the unregulated power source shown in Fig. 1a.

Fig. 2 is a detailed schematic circuit diagram of an electronic voltage and current regulator of the type shown generally in Fig. 1a.

Fig. 3 is an equivalent circuit applicable in explaining a part of the operation of the circuit of Fig. 2.

Fig. 4 is a graph showing output current as abscissa plotted against output voltage as ordinate for the electronic voltage and current regulator of Fig. 2.

Fig. 5 is a schematic circuit diagram of another embodiment of the electronic voltage and current regulator.

Fig. 6 is a block and partially schematic diagram of the circuits of Figs. 2 and 5.

Fig. 7a, 7b, 7c, and 7d are explanatory diagrams used to define and illustrate various terms and quantities used in the following specification.

Turning now to the drawings, and in particular to Fig. 1a, there is shown a block and partially schematic diagram of an electronic voltage and current regulator 10 interposed between an unregulated power source 11 and a variable load 12. In accordance with the present invention, power source 11 is provided not only with the usual common terminal 13 and main output terminal 14, but also with an auxiliary output terminal 15 the voltage at which differs slightly from that at terminal 14. Regulator 10 is provided with a common input terminal 16, a main voltage input terminal 17, and an auxiliary input terminal 18 which are adapted to be connected respectively to terminals 13 and 14 and 15 of the unregulated power source 11. Regulator 10 is further provided with a common output terminal 19 and a positive output terminal 20 which are adapted to be connected respectively to terminals 21 and 22 of load circuit 12. Common input and output terminals 16 and 19 of regulator 10 are directly connected together.

A power transistor Q1 which acts as a variable impedance has its emitter electrode 23 connected to main input terminal 17 and its collector terminal 24 connected to the positive output terminal 20 so that the transistor Q1 is in series between power source 11 and load 12. The base electrode 25 of power transistor Q1 is connected to a comparator and amplifier 26 which in turn is connected so as to sample the output voltage at terminal 20 and compare this voltage with a reference voltage from any convenient reference voltage source 27. Thus, by comparing the regulator output voltage to the reference voltage, amplifying the difference, and applying a control signal which is a function of this difference to the power transistor Q1, the regulator output voltage and hence the load circuit voltage is held constant in spite of unregulated input voltage and load impedance variation. In practice, however, as will be explained in greater detail below, available circuits for the comparator and amplifier 26 can at most reduce the current normally flowing out of the base electrode 25 to zero, or to a small positive value which reaches a minimum when amplifier 26 is cut off. With such a small positive base current there will still be a substantial flow of collector current.

In order to reduce this collector current still further, base electrode 25 is also connected through a resistor 28 to the auxiliary high voltage input terminal 18. In practice, when Q1 is a p-n-p transistor, the voltage at terminal 18 may be about one half to one volt more positive than is the voltage at the main input terminal 17. The resistance 28 is dimensioned to draw sufficient negative base current from terminal 18 when the normal source of base current from comparator and amplifier 26 is cut off to permit transistor Q1 and hence regulator 10 to operate properly at much smaller values of load current than is possible with only positive base current from amplifier 26.

Turning now to Figs. 1b and 1c, there are shown more detailed block diagrams of two alternative circuits which may be used to provide the auxiliary voltage output from the unregulated power source 11. Each of these circuits includes the common, main, and auxiliary output terminals required for the regulator 10. However, the circuit of Fig. 1b is adapted for use with a three phase supply, whereas the circuit of Fig. 1c is adapted for use with a single phase supply.

In the circuit of Fig. 1b, the secondary or output windings of the three phase transformer 29b are connected both to a full wave silicon rectifier bridge 30b and to a germanium rectifier half bridge 31b in a manner which may be seen in greater detail in Fig. 2. Effectively, the full wave silicon rectifier bridge and germanium rectifier half bridge are connected in parallel across the output windings of the three phase transformer. One output terminal of the silicon rectifier bridge is connected to the common terminal 13, whereas the other output terminal of the silicon rectifier bridge 30b is connected to the main output terminal 14 and the output terminal of the germanium rectifier half bridge 31b is connected to the auxiliary high output terminal 15. The operation of the circuit of Fig. 1b depends upon the fact that the forward bias required for reasonable values of current is approximately 0.5 volt larger for silicon than for germanium junction rectifiers. That is to say, the voltage drop across each of the silicon rectifiers is approximately one half volt greater than the voltage drop across each of the germanium rectifiers. Hence the voltage at main output terminal 14 will be approximately one half volt less than the voltage at auxiliary output terminal 15. Of course, it will be understood that the silicon and germanium types of rectifiers are shown merely by way of example and that any other suitable pair of rectifier types having different forward bias requirements may be used to provide any desired auxiliary output.

In a three phase system at the relatively low voltages needed to supply transistor circuitry, the ripple voltage is normally sufficiently low so that filtering means are not necessary in order to provide a voltage suitable for application to regulator 10. If a single phase supply is to be used, however, filtering means should be included in the circuit as shown in Fig. 1c. In Fig. 1c the silicon rectifier bridge 30c and the germanium rectifier bridge 31c are connected in parallel across the output terminals of a single phase transformer 29c which may derive its input from any convenient single phase supply. The output of the two bridges are fed respectively through filters 32 and 33 before being applied to the common, main, and auxiliary output terminals 13, 14 and 15 in a manner similar to that discussed above in connection with Fig. 1b. Filters 32 and 33 serve to remove the ripple components from the rectified voltage so as to provide substantially smooth D.-C. voltages at output terminals 13, 14 and 15.

As may be seen from a consideration of Figs. 1b and 1c, the use of dissimilar rectifiers provides two or more power sources, differing slightly in voltage, from the same transformer taps. More generally, multiple electrical wave-forms of similar shape but differing in instantaneous absolute voltage level may be derived from a single source. As will be seen from the detailed discussion below, such a supply is well adapted for use in conjunction with transistorized voltage regulator circuits. It will of course be understood, however, that the circuits of Figs. 1b and 1c may be used for any application requiring multiple voltage outputs of similar wave-form or shape but differing in D.-C. level.

Before turning to a detailed consideration of the circuit of Fig. 2, reference is made to Figs. 7a, 7b, 7c, and 7d for a clearer definition of certain terms which will be used in discussing the circuit of Fig. 2. In Fig. 7a there is shown a junction transistor Q of the p-n-p type. As is well known, such a transistor consists of two layers of p type semiconductor material, such as silicon or germanium doped with an impurity which results in an excess of holes, and an intervening layer of n type semiconductor material, such as silicon or germanium doped with an impurity which results in an excess of electrons. Ohmic connections are made for an emitter lead, e, and for a collector lead, c, to the p type regions while a similar connection is made to the n type region for the base lead, b. In the grounded base connection shown, the p-n junction between the emitter and base is biased in the forward direction by an external battery in series with a source of signal whereas the p-n junction between the collector and base is biased in the reverse direction by another external battery in series with the load $R_L$. For the purposes of this specification the current flow in such a network will be considered to be positive when it has the direction indicated by the arrows labeled $I_e$, $I_b$, and $I_c$ for the emitter, base and collector currents respectively.

In Figs. 7b, 7c, and 7d there are set forth certain well known relations by which any two of the above three currents can be expressed in terms of the third current and certain other properties of the transistor Q to be defined below. The first of these quantities is the no-signal or leakage collector current $I_{co}$ which is defined as the current flowing from the base to the collector when there is no current flowing in the emitter. The second of these quantities may be termed the large signal grounded base current gain, A, which may be defined as the ratio of the change in collector current to the corresponding change in emitter current at a constant collector voltage. The third of these quantities may be termed the large signal grounded emitter current gain, B, which may be defined as the ratio of the change in collector current to the corresponding change in base current at a constant collector voltage. It is also well known that the two quantities, A and B, are related as follows:

$$A = B/(1+B) \text{ and } B = A/(1-A)$$

Typical numerical values of the above quantities are as follows. For a signal transistor; A, .94–.99; B, 15–100; $I_{co}$, 2 μamp. For a power transistor; A, .97–.993; B, 30–150; $I_{co}$, 1 ma.

Returning now to Fig. 2 there is shown a complete circuit diagram of one typical embodiment of the regulator 10 supplied from an unregulated three phase power supply 11 of the type shown in block form in Fig. 1b. As noted above, three phase transformer 29b has its output terminals connected to a full-wave silicon rectifier bridge consisting of diodes D3—D4, D6—D7, and D9—D10 as shown in Fig. 2. Diodes D3, D6, and D9 are connected to common terminal 16 while diodes D4, D7, and D10 are connected to main input terminal 17 and, through a damping condenser C1, to common terminal 16. The germanium rectifier half bridge consists of diodes D5, D8, and D11 each of which is connected to auxiliary input terminal 18. Since the auxiliary germanium rectifier bridge is in parallel with the main silicon rectifier bridge, the negative half of the latter does not need to be duplicated in the germanium bridge. As noted above, the voltage difference between terminals 16 and 18 will be approximately one half volt greater than the voltage difference between terminals 16 and 17.

The p-n-p junction power transistor Q1 has its emitter 23 connected to main input terminal 17 through a resistor 34 and has its collector 24 normally connected to output terminal 20 through a test switch S1. The base 25 of transistor Q1 is connected to the emitter 35 of a signal transistor Q2 which forms the output stage of the comparator and amplifier 26 shown in Fig. 1a. Base 25 of power transistor Q1 is also connected to auxiliary input terminal 18 through a resistor 28. An asymmetrically conducting device such as diode D2 is connected in the forward direction between emitter 23 of power transistor Q1 and collector 36 of signal transistor Q2. Collector 36 is in turn connected through a resistor 38 to the common input terminal 16.

Considering for a moment one aspect of the operation of the portion of the circuit of Fig. 2 just described and shown in block and schematic form in Fig. 6, it will be apparent from the relations set forth in Fig. 7c that, with respect to power transistor Q1, if $I_b$ equals zero, then $I_c$ equals $(B+1)I_{co}$. But if $I_b$ equals $-I_{co}$, then $I_e$ equals zero and $I_c$ equals $I_{co}$. That is to say, in terms of the typical values for these quantities given above, the minimum collector current of Q1 can be reduced by about 100:1 over even the $I_b$ equals zero case by reversing the Q1 base current during Q2 cut-off and drawing negative base current equals to $-I_{co}$. To do this with a p-n-p transistor requires that the base circuit return to a potential more positive than the emitter. This higher potential is supplied in the circuit of Fig. 2 by auxiliary terminal 18. Of course, if an n-p-n transistor is used all relative polarities are simply reversed. The amount of negative base current which is drawn when low load current conditions result in cut-off of transistor Q2 can be controlled by appropriate selection of the size of resistor 28 which may readily be dimensioned so as to drive Q1 to cut-off.

The primary function of diode D2 and resistor 38 is to control a portion of the output characteristic of the regulator in a manner to be described below. However, they also have an important second function which should be considered in connection with the operation of the portion of the circuit described immediately above. D2 is preferably a silicon junction rectifier having a forward voltage drop of about one volt. Hence the series combination of D2 and resistor 38, connected as shown, keep the sum of the voltages between the emitter and base of Q1 and the emitter and collector of Q2 equal to about one volt. This low collector voltage on signal transistor Q2 is necessary during normal operation to keep its internal power dissipation low while conducting the relatively heavy currents through resistor 28 and the base of Q1. Of course, if one does not require control of the output characteristic the diode D2 and resistor 38 can be omitted if the output stage of comparator and amplifier 26 has a sufficiently large power rating. This latter alternative is that illustrated in the basic circuit of Fig. 1a.

Resistor 34 is included in the circuit of Fig. 2 to make the collector current of Q1 relatively independent of B and $I_{co}$. The Q1 base voltage is determined by the Q2 emitter current through resistor 28 to the auxiliary power input. With the base voltage of Q1 thus determined, its emitter current (which approximately equals its collector current) is set by the voltage drop across resistor 34. In practice the emitter of Q2 also draws some Q1 base current so that the above description must be considered approximate to this extent. Variations in B or $I_{co}$ of Q1 also result in some change in Q1 base current in spite of the use of resistor 34, but little change in Q1 emitter or collector current results. Resistor 34 is not shown in Figs. 1a or 6 since it is not essential to the basic principle of operation of the circuit.

The comparator and amplifier 26 of Fig. 1a is shown in Fig. 2 as the circuitry built around transistors Q3 and Q4. This comparator and amplifier is substantially the same as that shown in Fig. 3a of the above noted copending application of Paul A. Dodge and will consequently be described only briefly herein. A similar consideration applies to the reference voltage source 27 which is shown in Fig. 2 as the series combination of a Zener diode D1 and resistor 39 connected between output terminals 19 and 20 of regulator 10.

It is pointed out that the operation of the regulator in general is independent of whether the positive or the negative output terminal is assumed as a reference with respect to which voltages can be measured. For ease of mathematical description only, the following description assumes the regulator positive output terminal 20 is at ground potential. Considering now the operation of the comparator, the base of transistor Q4, which is one signal input to the comparator, is connected to the junction point between diode D1 and resistor 39. The other input to the comparator, the base of transistor Q3, is connected to the wiper arm of a potentiometer 42. Potentiometer 42 is part of a series connected voltage divider network consisting of resistors 40, 41, 42 and 43 connected in series between output terminals 20 and 19. The setting of the wiper arm of this potentiometer will in part determine the voltage, $V_{b3}$, at the base of transistor Q3 with respect to output terminal 20 and, as shown in the above noted copending application, will thus determine the value of output voltage for which the regulator is set. Should the output voltage, $V_L$, at terminal 19 change, a proportionate fraction of this change will appear at the base of Q3. This fraction is also determined by the setting of potentiometer 42. For convenience this fraction may be defined as $S=\Delta V_{b3}/\Delta V_L$. Its initial magnitude will determine the amount of Q3 base voltage change, $\Delta V_{b3}$, resulting from any change $\Delta V_L$ of output voltage. That is, $\Delta V_{b3}$ will equal $S\Delta V_L$. The base of transistor Q4 is connected through the Zener diode D1 to fixed output terminal 20, and thus remains at a fixed potential. Essentially Q3 and Q4 then operate as a difference amplifier to provide an appropriate signal $I_3$ to the base 37 of Q2 (via the collector of Q3) so that Q2 will control the impedance of Q1 in such a manner as to reduce the change in output voltage at terminal 20.

It will be noted that the emitters of Q3 and Q4 are connected together and are further connected through a resistor 44 to common output terminal 19 and that the collector of Q4 is connected to the junction of resistors 40 and 41 while the collector of Q3 is connected to the base of Q2. A damping or bypass condenser C2 is connected from the base of Q3 to common output terminal 19 and a similar condenser C3 is connected directly between output terminals 19 and 20.

The normal operation of this comparator circuit is comparable to the operation of a Schmitt circuit in its transition region where it is a fairly linear and very high gain D.-C. amplifier. Q3 cut-off corresponds to no load on the regulator while Q4 cut-off corresponds to full load. In between these extremes the circuit is a difference amplifier such that I3, the collector current of Q3 (and hence the base current of Q2), is proportional to the difference between the base voltage of Q3 and the base voltage of Q4. These base voltages in turn are respectively determined by the output voltage in the manner discussed above.

Best regulation is obtained when the output admittance, Y, of the regulator 10 is as large as possible or, in other words, when the output impedance, Z, is as small as possible. It can be shown that, with the wiper arm of potentiometer 42 set as shown in Fig. 2, by way of example, the output admittance is given by the expression $$Y_0 = B_1 B_2 B_3 \left( \frac{S_1}{1 - S_2 G_3 R_{40}} \right)$$

where $B_1$ is the ratio of the change in load current to the change in Q1 base current; $B_2$ is the ratio of the change in Q1 base current to the change in I3; $G_3$ is the ratio of the change in I3 to the change in $V_{b3}$; and S1 and S2 are resistance network attenuation factors such that S1 equals $R_{40}$ plus $R_{41}$ divided by the sum of $R_{40}$, $R_{41}$, $R_{42}$, and $R_{43}$, while S2 equals the sum of $R_{42}$ and $R_{43}$ divided by the sum of $R_{41}$, $R_{42}$, and $R_{43}$: Here the subscripts on the R's correspond to the reference characters used for these resistors in Fig. 2. Adjustment of the output impedance to any desired value may be made, as will be seen from the expression above, by adjusting the values of the resistors in the network of resistors 40, 41, 42, and 43. In particular it should be noted that infinite positive or negative admittance is available and that the output impedance, $Z_0$, will be greater than, equal to, or less than zero in accordance with whether resistor 40 is less than, equal to, or greater than $(1/S_2G_3)$. Freedom of choice of output impedance makes it possible, for example, to compensate for lead drop in cases where power must be distributed over fairly long distances.

From the above it follows that the apparent gain of this regulator is approximately infinity. The gain will actually vary somewhat with variation of $S_2$ and $G_3$. When this happens $B_1$ and $B_2$ also become variables. Nevertheless, in practice the output impedance of this supply can be made so small that, for a given environmental condition, load current variation from 100 ma. to 1 amp. will change an 11 volt output by only about plus or minus 0.05 volt.

In one practical embodiment the following components and circuit values have been found to yield exceptionally good performance. A.-C. supply to transformer 29b, 120/208 volts three phase 60 cycle; transformer 29b, type GE–9T35Y814; silicon diodes D3, D4, etc. type 1N537; germanium diodes D5, D8, and D11, type 1N91; D1 type 1N429; D2 type 1N536; Q1 type 2N173; Q2 type 2N123; Q3 and Q4 type 2N167; resistors: 28, 330 ohms; 34, 1 ohm; 39, 680 ohms; 40, 390 ohms; 41, 1500 ohms; 42, 1000 ohms pot.; 43, 1500 ohms; 44, 7500 ohms; condenser C1, 50 microfarads; C2, 0.1 microfarad, C3, 50 microfarads.

The circuit elements shown in Fig. 2 which are not defined above function only to indicate the operating state of the circuit or to analyze it for faults in a manner which will be described in detail below after a brief discussion of the inherent protection of the circuit from overload or low input voltage.

The comparator circuit of Fig. 2 maintains a very large and linear gain when both Q3 and Q4 are conducting. As load current gets larger and larger, Q3 takes more and more of the total current through resistor 44 until finally Q4 cuts off. This point determines the maximum available load current from the regulator. For any attempted loading beyond the Q4 cutoff point, transistor Q4, diode D1, and resistor 39 are effectively removed from the circuit. The resulting equivalent circuit for overload conditions is shown in Fig. 3. Q3 now is operating as an emitter follower. Its collector current is determined by the voltage drop across resistor 44 which is just a fraction of the output voltage. As any further decrease of load resistance occurs, the corresponding decrease in output voltage decreases Q3 current. This in turn decreases Q1 current to drop the output voltage even further. The circuit at this point is very nearly regenerative because any significant decrease in load resistance below the critical value corresponding to Q4 cutoff causes a rapid collapse of output voltage to a small value. After this collapse, Q3 current is essentially zero and the load current is somewhere between $I_{co}$ and $(B+1) I_{co}$ depending on how well Q1 is cutoff.

The output characteristic of the regulator 10 is shown in Fig. 4 which is a graph of output current in amperes plotted as abscissa against the output voltage in volts plotted as ordinate. This curve was obtained by bucking the output against another power supply to render operation at any point stable. The particular point of operation during use is obtained graphically by drawing a load line through the origin with slope equal to load resistance. With rated one ampere load for the illustrative circuit described in detail above, for example, line 1 is applicable. The solid line curve in Fig. 4 is the actual characteristic for the regulator circuit of Fig. 2. The dotted line nose at the point of maximum available load current shows what the output characteristic of the circuit of Fig. 2 would be if the current limiting effect of diode D2 and resistor 38 is ignored. The earlier mentioned output characteristic controlling function of this series combination of diode D2 and resistor 38 can be better understood from a more detailed consideration of this graph of Fig. 4.

Consider first the case illustrated by the dotted line nose. In this case any loading beyond the 6.5 ohms load line indicated in Fig. 4 as line 3 will cause the output voltage to deteriorate rapidly. A 4.5 ohm load, for example, results in an output of only about 6 volts as shown by load line 4. A short circuit out in the circuitry being powered would produce something like the 0.1 ohm line shown as line 5 which will draw about 100 ma. If the complete loading cycle from no load to short circuit and back to no load is followed, it will be noted that there is a hysteresis in the overload or hooked portion of the characteristic. In this region some load lines will produce a seemingly ambiguous operating point in that they intersect the curve at two or three different points. In fact, however, as resistance of the load changes the operating point moves smoothly along the characteristic curve until the load line just misses intersection with the curve in that immediate vicinity. When this occurs, the operating point jumps dynamically down the load line to the next stable point; that is, to the next intersection point of the curve and the load line.

An important criterion for recovery from short circuit is that the load line be able to surmount the hump 45 in the hysteresis portion of the curve down around short circuit values. In order to insure this action the perfect or ideal output characteristic would have an overload portion lying along the load line 3 or $R_L$ equals 6.5 ohms. If such a characteristic were available, it is apparent that loading in excess of this value would cause the circuit to assume a stable operating point at low output current by intersection of the load line in the overload branch of the characteristic. Then, on removal of the overload, the operating point would dynamically snap back to any intersection of the new load line in the normal regulation portion of the characteristic. In practice, the hump down near the origin of Fig. 4 is frequently encountered to a greater or lesser degree in various configurations and is believed to be a function of the gain nonlinearities of the various active elements when under regulator overload conditions. The danger is that when the short is removed the operating point may snap back to a second intersection in the overload portion of the characteristic rather than back to an intersection in the normal regulation region. That is to say, as noted above, it is desirable that the output characteristic be shaped so that probable load line values will be able to surmount the hump 45 down around short circuit.

The exact shape of the output characteristic, and the nose of the dotted curve, are somewhat a function of the various parameter gains and of the temperature of the junction of power transistor Q1. Also, for a particular configuration, the positioning of the hump 45 in the short circuit region is directly related to the value of the maximum current at the tip of the sharp dotted nose. That is to say, if the dimensioning of resistor 44 of Fig. 2 were decreased to provide displacement of the sharp dotted nose of Fig. 4 to a larger value of load current, then the load line generated by a load resistance somewhat less than the 4.5 ohms of line 4 would still not intersect the hump 45. Increasing this maximum current will move the hump generally out to higher load currents, whereas decreasing the maximum current will shift the hump towards lower load currents. In order to approximate the ideal characteristic noted above, therefore, it may be desirable from this point of view to permit the maximum load current to be considerably larger than "rated" load current. However, if one does only this, an additional problem arises. With a supply having a rated one amp current as shown by load line 1, for example, the amount of current which can be drawn in partial overload conditions, that is to say, loading between load lines 1 and 4, can not be permitted to be excessively large because of maximum power dissipation consideration for Q1.

In order to obtain the output characteristic shaping advantages of having the circuit designed for large maximum current such as indicated by the tip of the dotted line, and yet still restrict actual maximum current to values within ratings, the diode D2 and resistor 38 are used to produce the blunt nose of the characteristic shown in solid line at the area of transition from the normal regulation to the overload regions. That is to say, to assure that the short circuit hump is not a problem, the circuit may be dimensioned such that the sharp dotted nose may go out to really excessive current. The "stop" or blunt nose at about 1.6 amps in Fig. 4 is then generated by properly dimensioning the diode D2 and resistor 38 across the Q2 circuit. Q2 maximum collector current is produced when Q2 conducts all of the current through resistor 38, thereby cutting off diode D2. If the comparator and amplifier try to draw more than the corresponding amount of Q2 base current beyond this point, Q2 saturates ($\Delta I_c/\Delta I_b=1$ instead of approximately $=B$) and the blunt nose of the characteristic curve shown in Fig. 4 is produced. It follows that the positioning of this blunt nose along the abscissa or current axis can be varied by varying the magnitude of resistor 38. As the value of resistor 38 is increased, the blunt nose moves left to create smaller values of maximum available load current.

As previously stated, the exact shape of the output characteristic is a function of the various gains in the circuit; also, the short circuit hump is related to the maximum current at the tip of the sharp dotted nose. The curve shape will vary from unit to unit in a production run due to unavoidable component tolerances and within a single unit with environmental changes. However, it has been found that the use of the diode D2 and resistor 38 has a stabilizing influence in that it makes these tolerances less critical and results in more stably positioned maximum available load currents and short circuit humps.

Another important aspect of reliability of any circuit is that should some fault occur, it can be quickly and easily located and either repaired or replaced. To facilitate this, the circuit is provided with various built-in indicating and testing provisions which in a practical embodiment are available from the front or control panel of the regulated power supply.

Output terminal test point TP1 and TP2 are readily available terminals at which output voltage may be measured. The shaft of potentiometer 42 protrudes through the front panel so that the magnitude of this output voltage may be readily adjusted. Indicating lamps L1, L2, and L3 which may, for example, be colored red, white and green respectively, are also mounted in close proximity to each other on the control panel and are so connected into the circuit of Fig. 2 that during normal operation all three lamps will exhibit a uniform dim glow. Any disruption of these three uniform dim glows indicates a specific abnormality in the system.

The red short circuit indicating lamp circuit L1 is connected from main input terminal 17 to the collector of transistor Q1 thus giving a visual indication of the voltage drop across the regulator. A resistor 46 is placed in series with lamp L1 giving the designer freedom in altering the normal glow. The white load current indicating lamp L2 is connected in parallel with resistor 34 in the emitter circuit of transistor Q1 thus giving a visual indication of the load current magnitude. The green output voltage indicating lamp L3 is connected directly across terminals 19 and 20, thus giving a visual indication of the regulator output voltage. Test load resistor 47 is also connected between output terminal 19 and one terminal of test load switch S1 as shown in Fig. 2.

If any specific fault or failure occurs in the regulator, the uniformity of the three lamp glows will be disrupted. This will generally be characterized by having one or two indicators become very dim while another becomes brilliant. For an output short, for example, lamps L2 and L3 will go out completely and lamp L1 will provide a bright red warning.

In case of any indicator abnormality the operator pushes the switch S1 thereby disconnecting all external loads and substituting the test resistor 47. Whether or not this action restores the lights to their normal uniform dim glow tells the operator whether the difficulty is in the power supply itself or in the external load. Since in practice the power supply is built as a packaged unit using plug in connectors and quick disconnect fasteners, the entire supply can, if necessary, be replaced in about twenty seconds.

Regulator 10 is particularly adapted for use as a B+ power supply for transistor digital circuits. It is compatible with such circuits since it is a well regulated, high current, low voltage power supply having low output impedance, negligible line frequency sensitivity, good transient recovery time, and adequate overload protection, also, it is compatible in size and weight with popular forms of transistor digital circuit construction. The circuit of Fig. 2 further has the characteristic of passing only about ten per cent of normal rated load current into a short circuit and of providing automatic recovery from overload.

Many of the improvements contained in the B+ supply of Fig. 2 can be incorporated in a somewhat simpler lower voltage bias supply in accordance with the schematic circuit diagram of Fig. 5 and the block and schematic diagram of Fig. 6. Circuit components in Fig. 5 which are identical to those shown in Fig. 2 have been identified by the same reference character used in Fig. 2 and consequently will not be further described. The common circuit features of the regulators shown in Figs. 2 and 5 respectively may be seen more clearly by a comparison of these schematic circuit diagrams with the block and partially, schematic circuit diagram of Fig. 6 which shows the essential common features schematically and shows the differing portions of the circuits as the blocks 26 and 27.

The bias supply regulator of Fig. 5 does not embody short circuit proofing as such, but utilizes the current limiting function of diode D2 and resistor 38 discussed above to protect the circuit until the fuse F1 is blown by any overload which may occur. The fuse F1 is connected in series between input terminal 17 and the emitter 23 of transistor Q1.

The bias supply of Fig. 5 is intended to be adjustable down as low as one volt output and thus calls for a special type of comparator and amplifier. It is also difficult to generate stable reference voltages for such a low voltage circuit. The use of external B+ from terminal 18 as both a reference voltage source for the comparator and as the auxiliary higher voltage input terminal to which the base of transistor Q1 is returned is justified by assuming that the bias supply circuit will be used in conjunction with an adequately regulated B+ supply the output of which may be applied to terminal 18.

The comparator and amplifier function in the circuit of Fig. 5 is performed by a transistor Q5. For a positive supply, the base of transistor Q5 is held at a constant voltage derived from terminal 18 via potentiometer 51 which is connected in a series voltage-divider network also including resistors 50 and 52 all connected between terminal 18 and output terminal 19. The constant voltage at the base of transistor Q5 is constantly being compared with the output voltage at terminal 20 since the emitter of Q5 is directly connected to terminal 20. Any change in output voltage therefore produces an equal changes in the emitter to base voltage of transistor Q5 thereby causing a readjustment of the load current because of the resulting change in Q5 collector current on the current amplifier Q2.

As in Fig. 2, the Q1 base driving circuitry is not only connected to the emitter of current amplifier Q2 but is also returned to the positive external auxiliary voltage through resistor 28 so that negative base current can be provided when needed at light load and high power transistor temperatures. Diode D12 prevents uncontrollable Q1 base current should the external reference fail. The resistor 48 provides a shunt path for bypassing of Q2 with some of the Q5 collector current. This connection keeps some current flowing through Q5 even at no load in order to keep the transistor Q5 out of its low transconductance region at small collector currents. In addition a small bleeder resistor 53 and the voltage output indicator circuit consisting of lamp L3 and resistor 49 provide a path for the $I_{co}$ current to flow at no load.

In addition to its current limiting functions noted above, the silicon junction rectifier D2, as in the circuit of Fig. 2, also functions to keep the collector voltage on Q2 low to reduce its power dissipation when it conducts the relatively heavy Q1 base current and R28 current. Also as in the circuit of Fig. 2, the magnitude or dimensioning of the resistor 38 determines the point at which Q2 will saturate and thus limit the load current when an abnormally high loading condition is encountered. As noted above, this current limiting function will keep the power dissipation in the transistor Q1 at a reasonable level until the fuse F1 can blow. A resistor 46 and indicator lamp L4 are connected in parallel with fuse F1 to indicate fuse failure.

Although both the embodiment of Fig. 5 and that of Fig. 2 are shown by way of example as being series type regulators, it should be understood that the improvements embodied therein can also be applied to shunt type regulators in a manner which will be obvious to those skilled in the art. In such a shunt type regulator a resistor is placed in series between the main input and output terminals and the controlling transistor Q1 is connected across the output terminals in shunt with the load. Consequently, proper regulation requires that the impedance of the transistor become high at high load currents rather than at low load currents. Hence the above illustrated technique of returning the base of the transistor to a voltage permitting reversal of the base current of the transistor to increase its impedance will permit proper regulation at high load currents in the shunt type of regulator. Many of the other improvements and advantages discussed above may also be incorporated in the shunt type regulator in a similar manner.

While the principles of the invention have now been made clear, there will be immediately obvious to those skilled in the art many modifications in structure, arrangement, proportion, the elements and components used in the practice of the invention, and otherwise, which are particularly adapted for specific environments and operating requirements without departing from those principles. The appended claims are therefore intended to cover and embrace any such modifications within the limits of the true spirit and scope of the invention.

What I claim as new and desire to secure by Letters Patent of the United States is:

1. Apparatus for producing multiple electrical waveforms of the same shape but differing in instantaneous absolute voltage level comprising, a single source of electrical waveforms; a plurality of solid-state rectifier circuits connected in parallel to the output of said source; one output terminal common to all of said circuits, each of said circuits also having at least one separate output voltage terminal; all of the rectifiers in any one of said plurality of circuits being constructed of the same material, at least two of said circuits containing rectifiers constructed of different materials which have different forward bias voltage requirements; the output voltage appearing between said common terminal and said separate terminal of each of said circuits differing from that of any other of said circuits by an amount which is determined by the difference between the forward bias voltage requirements of the rectifiers in each of the two circuits respectively.

2. Apparatus as in claim 1 in which at least one of said plurality of rectifier circuits contains at least one germanium rectifier and at least one other of said plurality of rectifier circuits contains at least one silicon rectifier.

3. Apparatus as in claim 1 in which said source of waveforms is a three phase transformer adapted to be connected to a source of three phase power signal, and wherein a first of said rectifier circuits is a three phase full-wave bridge circuit and a second of said rectifier circuits is a three phase half bridge circuit.

4. Apparatus as in claim 1 in which said source of waveforms is a single phase transformer and wherein each of said rectifier circuits also contains an electrical filter means.

5. Apparatus for producing two electrical waveforms of the same shape but differing in absolute instantaneous voltage level comprising, a three phase transformer having three primary and three secondary windings, said primary windings being adapted to be connected to a source of waveforms, each of said secondary windings having at least one separate output tap; first, second, and third waveform output terminals; first, second, and third full wave rectifier bridge circuits, each of said three bridge circuits comprising two rectifiers, a first of said rectifiers in each bridge being connected between a different one of said output taps respectively and said first waveform output terminal, the second of said rectifiers in each bridge being connected between the same output tap as the other rectifier in said bridge and said second waveform terminal, said first and second rectifiers of each of said bridge circuits having opposite polarity of connection with respect to said output tap; each of the six rectifiers in said three bridge circuits having a first common forward bias voltage requirement; seventh, eighth and ninth rectifiers connected between a different one of said output taps respectively and said third waveform output terminal;

each of said seventh, eighth and ninth rectifiers having the same polarity with respect to said third waveform output terminal and further having a second common forward bias voltage requirement; said first and second common forward bias voltage requirements differing from each other; the voltages appearing between said first and second waveform output terminals and said first and third waveform output terminals respectively differing in absolute instantaneous voltage levels by an amount determined by the difference between said first and second common forward bias voltage requirements.

References Cited in the file of this patent

UNITED STATES PATENTS

| | | |
|---|---|---|
| 2,468,578 | Vladimir | Apr. 26, 1949 |
| 2,474,255 | Kelly | June 28, 1949 |
| 2,553,323 | Lord | May 15, 1951 |
| 2,624,039 | Jorgensen | Dec. 30, 1952 |
| 2,698,416 | Sherr | Dec. 28, 1954 |
| 2,762,965 | Walker | Sept. 11, 1956 |
| 2,807,774 | Dudziak et al. | Sept. 24, 1957 |
| 2,839,693 | Weise | June 17, 1958 |